March 21, 1961 H. L. ZIEGLER 2,976,196
APPARATUS FOR LAMINATING
Filed Sept. 13, 1957 3 Sheets-Sheet 1

INVENTOR.
HARRY L. ZIEGLER
BY Oscar L. Spencer
ATTORNEY

March 21, 1961  H. L. ZIEGLER  2,976,196
APPARATUS FOR LAMINATING
Filed Sept. 13, 1957  3 Sheets—Sheet 3

INVENTOR.
HARRY L. ZIEGLER
BY
Oscar L. Spencer
ATTORNEY

United States Patent Office 2,976,196
Patented Mar. 21, 1961

2,976,196
APPARATUS FOR LAMINATING
Harry L. Ziegler, Delmont, Pa., assignor to Pittsburgh Plate Glass Company, Allegheny County, Pa., a corporation of Pennsylvania
Filed Sept. 13, 1957, Ser. No. 683,844
11 Claims. (Cl. 154—2.71)

This invention relates to an apparatus for laminating a composite assembly of two glass sheets and a thermoplastic interlayer. The invention especially relates to an apparatus for the bonding of at least the marginal area of the interlayer to the glass sheets. This type of bonding is known as prepressing of a composite assembly. The article resulting from the prepressing is subsequently treated at an elevated temperature and pressure for bonding the glass sheets to the entire area of the thermoplastic interlayer.

With the development of the more complex types of laminated glass assemblies for use as windshields in automobiles it was not possible to preliminary press the composite assemblies by the use of an apparatus having a pair of nipper rolls. To laminate these composite assemblies, there were developed an apparatus and a method utilizing the apparatus. The apparatus is a continuous channel-shaped member that surrounds the composite assembly or sandwich. The channel-shaped member is essentially tubular and can be made from a piece of tubing that is split longitudinally and has its ends joined. A tube is connected to the channel-shaped member and is in alignment with a hole in the web or outermost wall of the channel-shaped member. The tube connected to the channel-shaped member is connected to a vacuum source for evacuating air from between the thermoplastic interlayer and the glass sheets of the composite assembly. While maintaining the vacuum the composite assembly is subjected to an elevated temperature to provide a bonding between the interlayer and the glass sheets in at least the marginal area. The channel-shaped member is then removed from around the composite assembly and the latter is subjected to an elevated temperature and an elevated pressure, for example, by the conventional treatment in an oil in an autoclave, to bond the plastic interlayer to the glass sheets throughout the entire area.

It is an object of this invention to provide an apparatus for laminating a composite assembly of two glass sheets and a thermoplastic interlayer in which the composite assembly is evacuated by means of a continuous channel-shaped member and the vacuum is continuouly maintained while moving the channel-shaped member and the composite assembly through an oven for bonding at least the marginal area of the thermoplastic interlayer to the glass sheets.

Other objects of the present invention will be apparent to those skilled in the art from the description of the preferred embodiment of the apparatus which follows when taken in conjunction with the drawings in which like parts are designated by the same numeral and in which.

Figure 3:
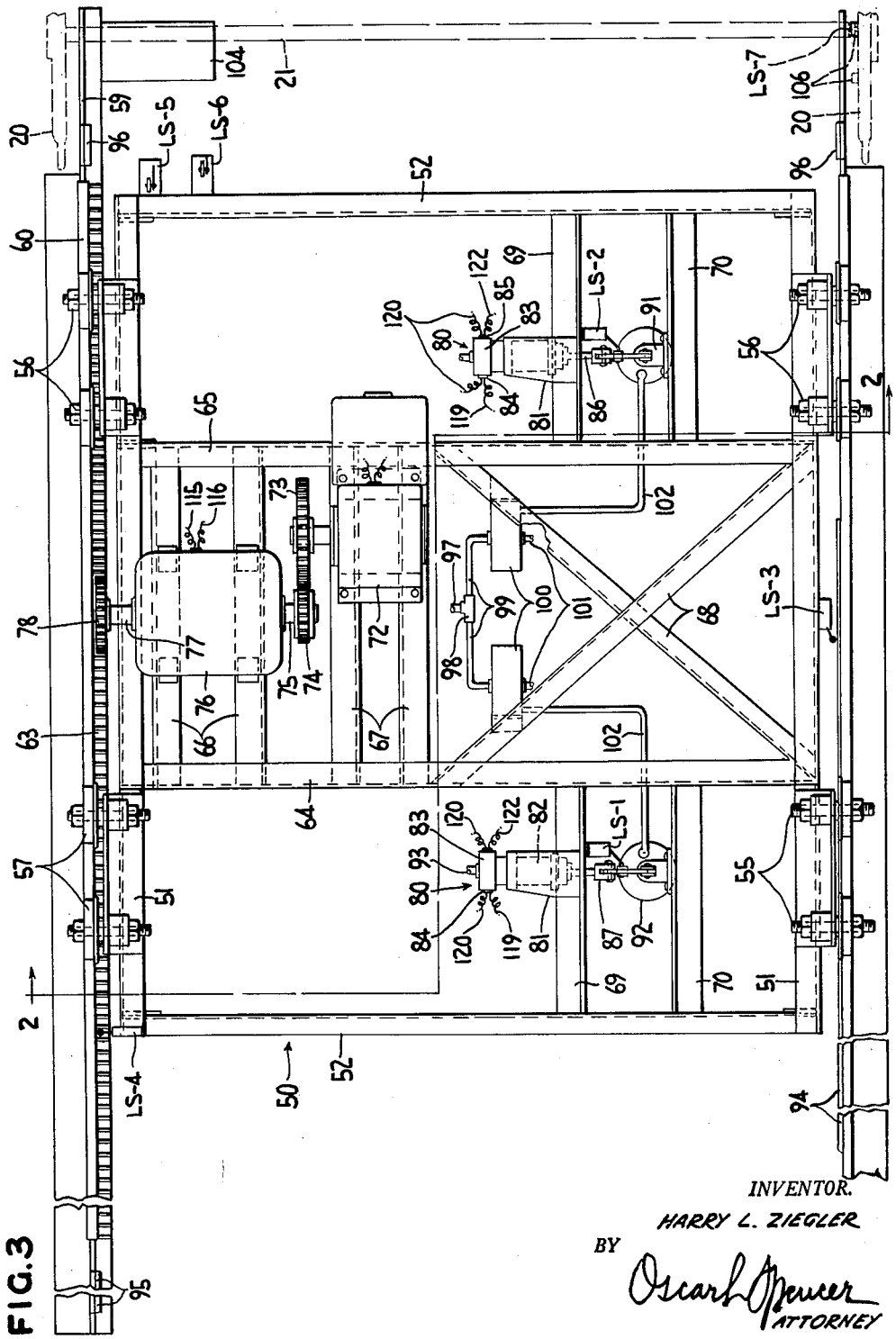
Figure 4:
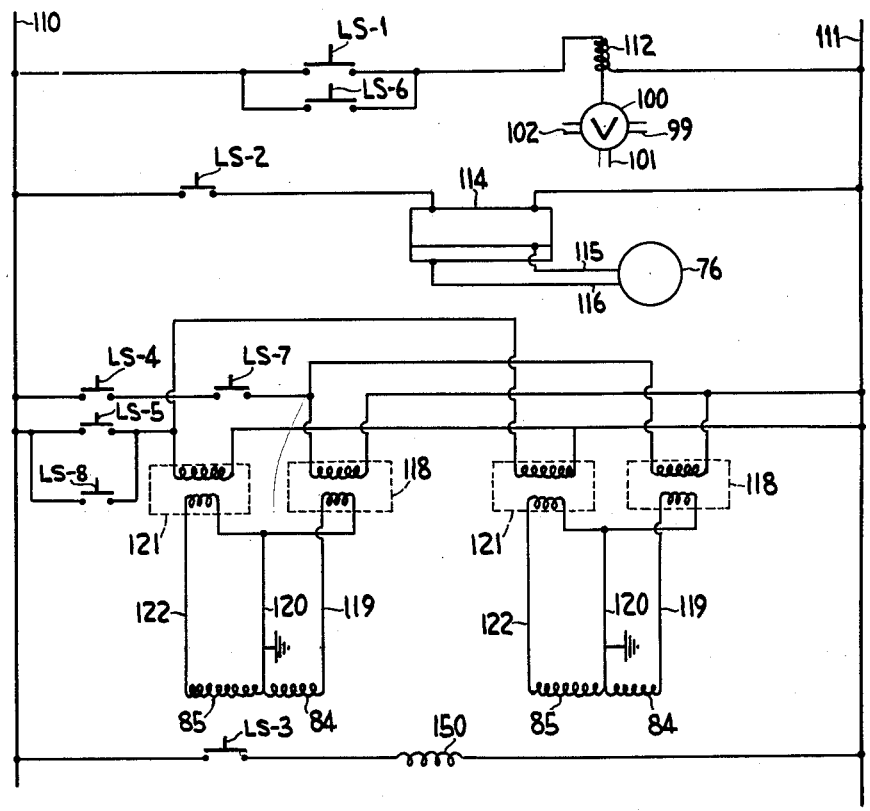

Fig. 3 is a plan view of one end of the apparatus of the invention but with the vacuum tanks and part of the conveyor system for the vacuum tanks removed as well as most of the supporting structure; and Fig. 4 is a schematic drawing of the electrical control system by which the evacuator system is brought into and out of engagement with the vacuum tanks and by which the carriage, on which the evacuation system is mounted, is returned to its initial position for engagement of the evacuator system with the vacuum tanks.

A supporting structure generally indicated at 10 has vertical posts 11 to which are secured angle irons 12. Channel irons 13 are secured to posts 11 by brackets 14. A pair of link chains generally indicated at 15 and having rollers 16 extend the length of the supporting structure. The chains 15 are driven at one end of the supporting structure 10 by sprockets (not shown) that are driven by a motor (not shown). The chains 15 also engage sprockets 20 at the other end of the supporting structure 10 as seen in Fig. 3. The sprockets 20 are rotatably mounted on a shaft 21 adjustably mounted to supporting structure 10. The rollers 16 of chains 15 are supported in the top horizontal run of chains 15 by a guide rail 22 for one of chains 15 and support rail 23 for the other chain 15, which are mounted on the top of channel irons 13 that extend longitudinally on the supporting structure. The bottom horizontal run of chains 15 is supported by angle irons 12 that also extend longitudinally on the supporting structure 10.

The chains 15 have links 24. Some of the links 24 on one side of each of the chains 15 are provided with flanges 25 on which are mounted bearing blocks 26. Sets of two adjacent links 24 are thus provided with flanges 25.

Opposed bearing blocks 26 mounted on chains 15 support a vacuum tank 28 which is a hollow cylinder that is closed at the ends. Bars 29 and 30 extend from the ends of vacuum tank 28. The bars 29 and 30 are supported by the opposed bearing blocks 26. A female coupling 31 having a check valve (not shown) is secured to bar 30 which has a conduit 32 communicating with the chamber of vacuum tank 28. With this arrangement a vacuum hose having a male coupling at one end and connected at the other to a vacuum source can be connected manually by means of coupling 31 to provide a direct connection of tank 28 to the vacuum source. The vacuum can be maintained in tank 28 by periodic manual connection of the vacuum hose to coupling 31 when the evacuator system of the present invention is shut down, e.g., for replacement of worn parts.

The pair of opposed bearing blocks 26 adjacent the pair of bearing blocks 26 supporting vacuum tank 28 supports a vacuum tank 34 by a pair of bars 29 instead of bar 29 and bar 30. However, vacuum in tank 34 can be restored periodically through the application of vacuum to tank 28 because tanks 28 and 34 are interconnected by rubber tubing 36.

Each of tanks 28 and 34 is wrapped helically with asbestos tape. In addition at two places along the tank, bands of asbestos are wrapped around tanks 28 and 34 to provide annular ribs 38. A set of tanks, i.e., tank 28 and tank 34 mounted to adjacent flanges 25 of links 24, provides for support of a composite assembly C when tanks 28 and 34 are on the top run, i.e., when chains 15 are supported by rails 22 and 23. The composite assembly C rests on ribs 38 of tank 28 and tank 34.

The composite assembly C is placed on the pair of tanks 28 and 34 at one end of the apparatus of the preferred embodiment of the invention. The edges of composite assembly C project beyond tanks 28 and 34. A continuous split tubing or channel-shaped flexible member 40 is placed around the margin of composite assembly C so that the flanges of the split tubing 40 engage the marginal surfaces of the glass sheets of assembly C. A flexible tubing 41 is integrally joined at one end to tubing 40 in alignment with a hole (not shown) in the wall of tubing 40. The male part 42 of a quick disconnecting coupling is connected to the other end of tubing 41. The female part 43 of the quick disconnecting coupling is secured on a pipe 44 that is mounted on tank 28. The pipe 42 extends into tank 28. The female part 43 is provided with a conventional mechanically controlled diaphragm which is normally closed but which is opened when the male part 42 of the coupling is joined to the female part 43. When thus joined, tank 28 and tank 34 connected to it serve as a vacuum source. Thus air that is between the thermoplastic interlayer and the glass sheets of composite assembly C is evacuated by the use of channel-shaped member 40, tubing 41, coupling parts 42 and 43, pipe 44, and tanks 28 and 34.

A composite assembly C is placed on a set of tanks 28 and 34 near the right-hand end (as viewed in Fig. 1) of the top run. As the composite assembly moves to the left, channel-shaped member 40 is placed around assembly C. Then parts 42 and 43 are joined to evacuate air from between the interlayer and the glass sheets of assembly C. The assembly C is conveyed substantially the entire length of top run of the conveyor. Except for relatively short sections at each end of the top and bottom runs, the horizontal runs of the conveyor, or at least the top run of chains 15, are through an elongated oven 46. The heat of oven 46 and the vacuum provided by channel-shaped member 40, tubing 41 and tanks 28 and 34 result in bonding of at least the marginal area of the composite assembly C during passage through oven 46.

Figure 2:
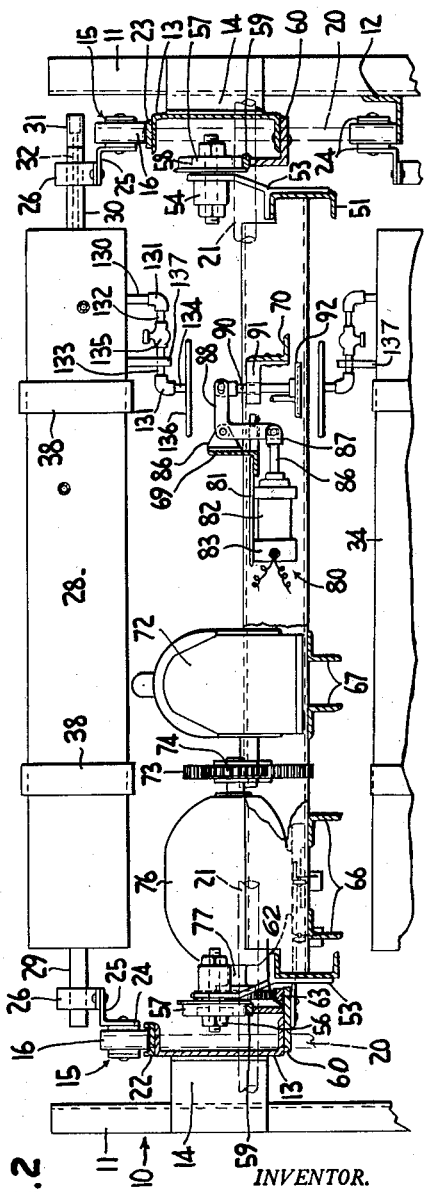
Fig. 2 is a cross section of the apparatus taken along the line 2—2 of Fig. 3.

A carriage generally indicated at 50 has a pair of channel irons 51 joined at the ends by a pair of channel irons 52. Brackets 53 supporting sleeves 54 are secured to channel irons 51. Pins 55 threaded at each end are supported by sleeves 54. Nuts 56 are threaded on the ends of pins 55. Flanged wheels 57 are rotatably mounted on pins 55 by means of bearings 58. The carriage 50 is supported by means of flanged wheels 57 is supported by rails 59 mounted on supports 60 secured to channel irons 13. Each of the supports 60 on the left-hand side of carriage 50 as viewed in Fig. 2 has a lateral extension 62 on which is mounted a rack 63.

The carriage 50 has channel irons 64 and 65 secured to channel irons 51 between channel irons 52. A pair of angle irons 66 and a pair of angle irons 67, as well as a pair of intersecting angle irons 68, are secured to channel irons 64 and 65. The carriage 50 also has angle irons 69 and 70 which are secured at one end to one of channel irons 52 and at the other end to either channel iron 64 or channel iron 65.

A motor 72 mounted on angle irons 67 of carriage 50 drives a gear 73. A gear 74 engages and is driven by gear 73. The gear 74 is fixed on the driver shaft 75 of a magnetic clutch 76 mounted on angle irons 66 of carriage 50. The clutch 76 has a driven shaft 77 on which is fixed a gear 78 that meshes with rack 63.

Air motors generally indicated at 80 are mounted on angle irons 69 by means of brackets 81. Each of the air motors 80 has an air cylinder 82 and a four-way valve 83 having two solenoids 84 and 85. The air motor 80 is an integral unit and is shown in U.S. Patent No. 2,641,229. On the piston rod 86 of each air motor 80 is mounted a clevis 87 linked to one end of bell crank 88 pivotally mounted to support 89 secured to angle iron 69. The other arm of bell crank 88 is linked to a rod 90 slidably mounted in guide 91 secured to angle iron 70. Of course, the holes in bell crank 88 for linking clevis 87 and rod 90 are slotted. A vacuum cup 92 is mounted at the other end of rod 90. With this construction retracting of piston rod 86 produces a downward movement of vacuum cup 92 which is a means for coupling the tanks to a vacuum source. Air under pressure from a source (not shown) is introduced into valves 83 of motors 80 by inlet pipes 93.

A limit switch LS-1 is mounted on angle iron 69. The limit switch LS-1 is normally open and is tripped by one of the bell cranks 88 when piston rod 86 is in the extended position, i.e., when vacuum cup 92 is in its raised position. When piston rod 86 of air motor 80 is retracted, limit switch LS-1 returns to its normally open position. Another limit switch LS-2 is mounted on the other angle iron 69 and is normally open. The limit switch LS-2 is tripped to close it when the piston rod 86 of the other air motor 80 is in the extended position, that is, with vacuum cup 92 in the raised position.

A bar 94 is mounted on support 60 to which is secured rail 59 on one side of the supporting structure. The bar 94 is positioned so that it will be engaged by a limit switch LS-3 that is normally open. The bar 94 closes the switch LS-3 when the carriage 50 is at its extreme right end as viewed in Figs. 1 and 3, but the left end of bar 94 is to the right of the position of limit switch LS-3 when carriage 50 is at its extreme left-hand position. By this construction, the limit switch LS-3 is opened when the carriage 50 approaches the left-hand end of its movement on the supporting structure 10 and remains open while the carriage 50 is at the left end of its range of movement.

Figure 1:
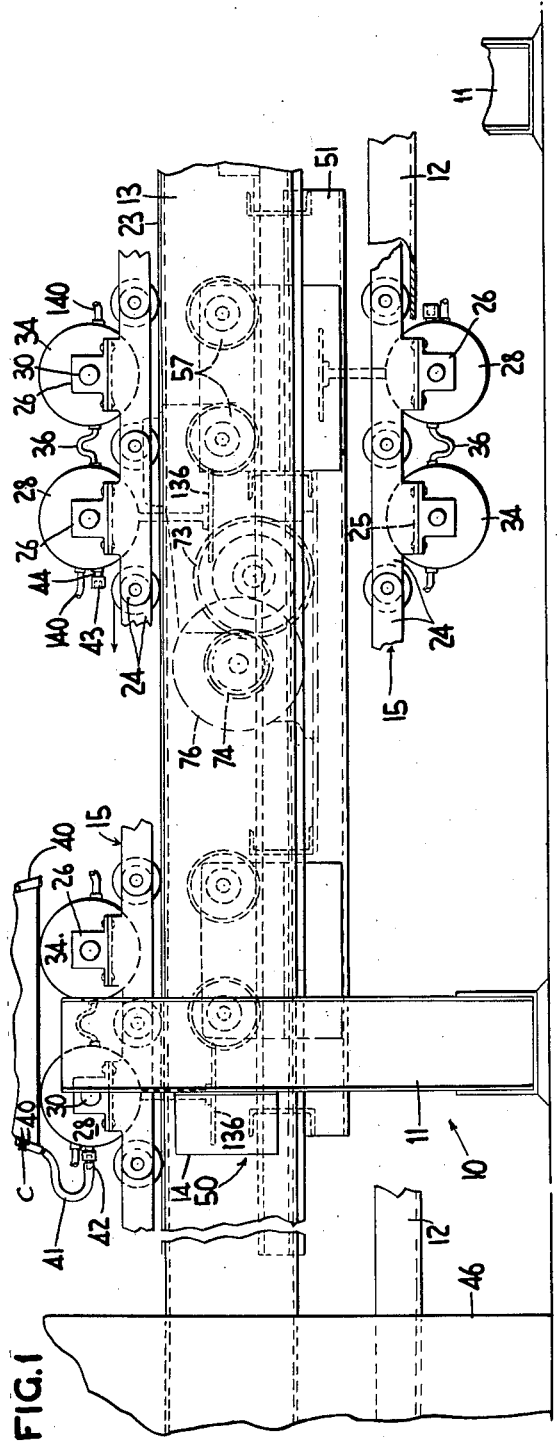
Fig. 1 is an elevation of the apparatus of the invention.

The left-hand and right-hand maximum positions for carriage 50 are determined by stop members 95 and stop members 96, respectively, secured to supports 60. With this construction the carriage 50 can be moved between the right end of the supporting structure to a position adjacent the entering end of the oven 46 (Fig. 1).

A pipe 97 is connected to a vacuum pump (not shown) and a coupling 98 that is also connected to pipes 99. The pipes 99 are connected to solenoid-operated vacuum valves 100 that are normally closed. Each of the valves 100 has an exhaust pipe 101 and a pipe 102 communicating at its other end with one of the vacuum cups 92.

At one corner of the carriage 50 there is a limit switch LS-4 which is normally open. The switch LS-4 is closed when it is engaged by one of the stop members 95 when carriage 50 is at the extreme left-hand end as viewed in Fig. 3.

A trip plate 104 is secured to support 60 at the right end (Fig. 3) of one of the supports 60 adjacent sprocket 20. Limit switches LS-5 and LS-6 are mounted to channel irons 51. Limit switches LS-5 and LS-6 are normally open and are closed when they contact plate 104 when carriage moves to the extreme right end as viewed in Fig. 3.

A limit switch LS-7 is mounted on shaft 21. One of sprockets 20 is provided with dogs 106 that trip limit switch LS-7 when sprocket 20 rotates. The number of dogs 106 on sprocket 20 is determined by the spacing between sets of vacuum tanks 28 and 34.

Referring to Fig. 4, the electrical control system is as follows. Lines 110 and 111 are connected to a 110-volt source (not shown) of alternating current. Limit switches LS-1 and LS-6 are in parallel with each other and both are in series with a solenoid 112 for each of vacuum valves 100. Only one of valves 100 is shown and, of course, the other valve 100 would be in parallel with it and in series with limit switches LS-1 and LS-6. This arrangement provides one of the parallel circuits between lines 110 and 111.

Another of the parallel circuits between lines 110 and 111 has the limit switch LS-2 in series with a rectifier 114 that provides direct current by lines 115 and 116 to magnetic clutch 76.

A third parallel circuit between lines 110 and 111 has limit switches LS-4 and LS-7 in series with each other and with transformers 118 that provide an eight-volt current to line 119, solenoid 84 that operate the four-way valve 83 and grounded line 120 so that piston rod 86 of each air cylinder 82 is retracted to lower vacuum cups 92. Similarly another parallel circuit has limit switch LS-5 in series with transformers 121 that provide an eight-volt current by line 122 to solenoid 85 and line 120 of each air motor 80 for advancing piston rod 86. In series with transformers 85 but in parallel with limit switch LS-5 is a limit switch LS-8 that is also normally open but will be closed when the vacuum of the vacuum source fails to be maintained at a predetermined minimum value. Closing of switch LS-8 serves to raise vacuum cups 92 by rotating bell crank 88, thus also closing limit switch LS-1 to close valve 100.

The last parallel circuit has limit switch LS-3 in series with a coil 150 of the starter (not shown) for motor 72.

Each of the tanks 28 is provided with a pipe 130 mounted through the wall and connected by elbows 131, pipes 132, 133 and 134, and a check valve 135 to a bearing plate 136. A support 137 is connected to tank 28 and pipe 133. One of the vacuum cups 92, when lowered at the right moment, engages one of the bearing plates which has a centrally disposed aperture communicating with pipe 134.

Tank 28 of one set is connected by flexible tubing 140 to tank 34 of the adjacent set.

Operation

The sets of vacuum tanks 28 and 34 are moved in a cyclic path including through oven 46. At the start of the operation of carriage 50 it is at the extreme left-hand end of its movement with wheels 57 against stop members 95. Vacuum cups 92 are in the raised position so that limit switches LS-1 and LS-2 are closed by bell cranks 88. With limit switch LS-2 closed current flows to rectifier 114 thereby operating clutch 76. With limit switch LS-1 closed current flows through solenoid 112 of each of the vacuum valves 100 thereby closing valves 100 so that each pipe 102 communicates with exhaust pipe 101 and is not in communication with pipe 99 that extends from the vacuum source. The limit switch LS-3 is not engaging bar 94 so that limit switch LS-3 is in its normally open position and no current flows through coil 150 to run motor 72. However, because clutch 76 is energized, the movement of carriage 50 is restrained. Carriage 50 remains at the left-hand end until it is moved by a set of vacuum tanks 28 and 34 as described below.

When one of the dogs 106 on one of sprockets 20 trips or closes limit switch LS-7, which is in series with limit switch LS-4 already closed by engagement with one of the stop members 95, current flows to transformers 118. This results in a flow of current to solenoids 84, thereby operating the four-way valves 83 of air motors 80 to retract piston rods 86. The retraction of piston rods 86 lowers vacuum cups 92 against bearing plates 136 of opposed tanks 28. Retraction of rods 86 rotates bell cranks 88 thereby at the end of the rotation disengaging the latter from limit switches LS-1 and LS-2 which return to their normally open position. With the opening of limit switch LS-1, the flow of current through solenoid 112 of vacuum valve 100 ceases and valve 100 returns to its normally open position to provide communication between pipe 99 and pipe 102 at the same time shutting off communication between exhaust pipe 101 and pipe 99. At the same time the opening of limit switch LS-2 stops the flow of current to rectifier 114 thereby deenergizing clutch 76.

With the opening of valve 100 so that pipe 102 communicates with pipe 99 connected to the vacuum source and the vacuum cups 92 previously brought against bearing plates 136 the chambers of tanks 28 and through them the chambers of tanks 34 are brought into communication with the vacuum source. If the vacuum of tanks 28 and 34 of the two sets is less than that of the vacuum source, air will be evacuated from tanks 28 and 34 through vacuum cups 92, bearing plates 136, check valves 135 and vacuum valves 100.

By the engagement of vacuum cups 92 with bearing plates 136 and the application of the vacuum to cups 92, the carriage 50 becomes mechanically linked to the sets of vacuum tanks 28 and thus moves with tanks 28. The carriage 50 is moved from left to right as viewed in Figs. 1 and 3 with tanks 28 in the bottom run of their movement.

As carriage 50 moves from left to right the limit switch LS-3 is tripped by bar 94 to close the switch and current flows through coil 150 to start the motor 72. The limit switch LS-3 remains closed for the entire movement of carriage 50 to the right. However, the clutch 76 is not energized so that gear 77 rotates freely on rack 63.

When the carriage 50 has moved sufficiently far to the right, limit switch LS-5 and then limit switch LS-6 are closed by plate 104. Carriage 50 continues to move a short distance beyond this point. The limit switch LS-6 is closed first to close vacuum valves 100 by energizing solenoids 112 with the result that pipes 102 communicate with exhaust pipes 101 and no longer communicate with pipes 99. Vacuum in cups 92 is thus released. Closing limit switch LS-5 produces the flow of current through transformers 121 to energize solenoids 85. As a result the piston rods 86 are advanced, thereby rotating bell cranks 88 to raise vacuum cups 92.

Because switch LS-6 is closed by plate 104, valve 100 remains in its closed position, i.e., where pipe 102 communicates with pipe 101 rather than pipe 99, and limit switch LS-1 is tripped by bell crank 88 to close a circuit to energize solenoid 112 thereby holding valve 100 in a closed position. The rotation of the other bell crank 88 by the advancing of piston rods 86 of the air motors 80 closes limit switch LS-2 thereby permitting flow of current to rectifier 114 to energize clutch 76. With this sequence of events, the motor 72, which has been operating, through energized clutch 76 rotates gear 77 on rack 63 to return carriage 50 to its initial position.

As the carriage 50 approaches the initial position at the left end of its movement limit switch LS-3 passes beyond bar 94 and thus returns to its normally open position. This opens the circuit for motor 72 and stops the motor. The carriage coasts to a stop. The final position is determined by stop members 95 that are abutted by wheels 57 of carriage 50. Clutch 76 remains energized. A dog 106 trips switch LS-7 to start the next cycle.

Because all of the tanks 28 and 34 are interconnected by means of tubing 140, an essentially continuous vacuum source is provided to maintain the vacuum supplied to the channel-shaped members 40 mounted around the composite assemblies C as chains 15 pass through oven 46. The speed of the conveyor, including chains 15, is chosen to provide a proper residence time within the oven. For example, with a residence time of the order of four to five minutes with the temperatures of the three zones of the oven at 270° F., 330° F. and 340° F. the glass surface temperature is raised to an average of about 230° F. The vacuum maintained in tanks 28 and 34 is preferably at least 20 inches of mercury.

The foregoing is a description of the preferred embodiment of the apparatus of the invention. Many modifications will be apparent to those skilled in the art. The embodiment is presented for purposes of illustration only. The invention is not limited except by the claims that follow.

I claim:

1. An apparatus for laminating a composite assembly of two glass sheets and a thermoplastic interlayer comprising an oven, vacuum tanks, means for conveying the tanks through the oven and in a cyclic path including first and second stations outside the oven and on the same side of the oven, means for coupling the tanks to a vacuum source, means for moving said coupling means between the first and second stations, means for moving the coupling means toward and into engagement with each of the tanks at the first station, means for moving the coupling means away from each of the tanks for disengagement of the tanks and the coupling means at the second station and a part of a coupling mounted on and communicating with each of some of said tanks, each said part of a coupling being closed except when engaged by another part of said coupling, whereby the vacuum from the tank and heat from the oven provide at least marginal bonding of the composite assembly.

2. An apparatus for laminating a composite assembly of two glass sheets and a thermoplastic interlayer comprising a supporting structure, an oven, vacuum tanks, conveyor means on the supporting structure for moving the tanks through the oven and in a cyclic path having top and bottom horizontal main portions, a carriage mounted to the supporting structure for horizontal movement between first and second stations outside the oven and on the same side of the oven, evacuator means mounted on the carriage, means for engaging the evacuator means to one of the tanks with the carriage at the first station, means for disengaging the evacuator means from the tank with the carriage at the second station and means for moving the carriage from the second station to the first station, whereby the vacuum from the tank and heat from the oven provide at least marginal bonding of the composite assembly.

3. An apparatus for laminating a composite assembly of two glass sheets and a thermoplastic interlayer comprising vacuum tanks, means for conveying the tanks in a cyclic path including first and second stations, means for coupling the tanks to a vacuum source, means for moving said coupling means between the first and second stations, means for engaging the evacuator means to the tanks at the first station, means for moving the coupling means away from each of the tanks for disengagement of the tanks and the coupling means at the second station and a part of a coupling mounted on and communicating with each of some of said tanks, each said part of a coupling being closed except when engaged by another part of said coupling.

4. An apparatus for laminating a composite assembly of two glass sheets and a thermoplastic interlayer comprising vacuum tanks, means for conveying the tanks in a cyclic path normal to the longitudinal axes of the tanks including first and second stations, means for coupling the tanks to a vacuum source, means for moving said coupling means between the first and second stations, means for moving the coupling means toward and into engagement with each of the tanks at the first station, means for moving the coupling means away from each of the tanks for disengagement of the tanks and the coupling means at the second station and a part of a coupling mounted on and communicating with each of some of said tanks, each said part of a coupling being closed except when engaged by another part of said coupling.

5. An apparatus for laminating a composite assembly of two glass sheets and a thermoplastic interlayer comprising a supporting structure, vacuum tanks, conveyor means on the supporting structure for moving the tanks in a cyclic path having top and bottom horizontal main portions, a carriage mounted to the supporting structure for horizontal movement between first and second stations, evacuator means mounted on the carriage, means for engaging the evacuator means to one of the tanks with the carriage at the first station, means for disengaging the evacuator means from the tank with the carriage at the second station and means for moving the carriage from the second station to the first station.

6. An apparatus for laminating a composite assembly of two glass sheets and a thermoplastic interlayer comprising a supporting structure, vacuum tanks, conveyor means on the supporting structure for moving the tanks in a cyclic path having a portion in a horizontal plane, said conveyor means including a pair of chains, rails mounted on the supporting structure, a carriage supported by the rails for movement from a first station to a second station in a horizontal plane, evacuator means on the carriage, means for engaging the evacuator means to one of the tanks with the carriage at the first station, means for disengaging the evacuator means from the tank with the carriage at the second station and means for moving the carriage from the second station to the first station.

7. An apparatus for laminating a composite assembly of two glass sheets and a thermoplastic interlayer comprising a supporting structure, vacuum tanks having coupling means, a pair of conveyor chains, connector means between the chains and the ends of the tanks, means for moving the chains in a cyclic path, pairs of rails for supporting the chains in top and bottom horizontal planes of the cyclic path, a wheeled carriage, a pair of rails for supporting the carriage during horizontal movement between first and second stations of the carriage, evacuator means mounted on the carriage and including coupling means, means for moving the coupling means of the evacuator means into engagement with the coupling means of one of the tanks with the carriage at the first station and out of engagement with the coupling means of the tank with the carriage at the second station, and means for moving the carriage from the second station to the first station.

8. An apparatus for laminating a composite assembly of two glass sheets and a thermoplastic interlayer comprising a supporting structure, vacuum tanks having coupling means, a pair of conveyor chains, connector means between the chains and the ends of the tanks, means for moving the chains in a cyclic path, pairs of rails for supporting the chains in top and bottom horizontal planes of the cyclic path, said coupling means of said tanks extending upwardly with the tanks in the bottom horizontal plane of the cyclic path, a wheeled carriage, a pair of rails for supporting the carriage during horizontal movement between first and second stations of the carriage, evacuator means mounted on the carriage and including coupling means, means for moving downwardly the coupling means of the evacuator means into engagement with the coupling means of one of the tanks with the carriage at the first station and upwardly out of engagement with the coupling means of the tank with the carriage at the second station, and means for moving the carriage from the second station to the first station.

9. An apparatus for laminating a composite assembly of two glass sheets and a thermoplastic interlayer comprising a supporting structure, vacuum tanks having one-way valved coupling means, a pair of conveyor chains, connector means between the chains and the ends of the tanks, means for moving the chains in a cyclic path, pairs of rails for supporting the chains in top and bottom horizontal planes of the cyclic path, a wheeled carriage, a pair of rails for supporting the carriage during horizontal movement between first and second stations of the carriage, evacuator means mounted on the carriage and including an actuated valve and coupling means, power means for moving the coupling means of the evacuator means from a first position out of engagement with the coupling means of one of the tanks and a second position in engagement with the coupling means of the tank, means for actuating the power means to move the coupling means of the evacuator means into engaging position with the carriage at the first station, means for actuating the power means to move the coupling means of the evacuator means to disengaging position with the carriage at the second station, means operated by the power means for actuating the valve of the evacuator means and means for moving the carriage from the second station to the first station.

10. The apparatus of claim 9 wherein the power means moves the coupling means of the evacuator means downwardly to engage the coupling means of the tank extending upwardly from the tank in the bottom horizontal plane of the cyclic path.

11. The apparatus of claim 10 and further including conduit means connecting each tank to the adjacent tanks.

References Cited in the file of this patent

UNITED STATES PATENTS

| | | |
|---|---|---|
| 1,905,189 | Sherts | Apr. 25, 1933 |
| 2,028,927 | Sherts | Jan. 28, 1936 |
| 2,028,928 | Sherts | Jan. 28, 1936 |
| 2,726,799 | Dodge et al. | Dec. 13, 1955 |
| 2,751,123 | Kuhles et al. | June 19, 1956 |
| 2,783,176 | Boicey | Feb. 26, 1957 |
| 2,832,478 | Malewicz et al. | Apr. 29, 1958 |
| 2,877,811 | Brenneck | Mar. 17, 1959 |